United States Patent [19]
Endres et al.

[11] Patent Number: 5,323,645
[45] Date of Patent: Jun. 28, 1994

[54] DEVICE TO INVESTIGATE THE FLOW MOVEMENT IN CYLINDRICAL COMPONENTS

[75] Inventors: Helmut Endres, Herzogenrath; Heinz-Jakob Neusser, Aachen; Michael Breuer, Simmerath, all of Fed. Rep. of Germany

[73] Assignee: FEV Motorentechnik GmbH & Co. KG, Aachen, Fed. Rep. of Germany

[21] Appl. No.: 946,578

[22] Filed: Sep. 18, 1992

[30] Foreign Application Priority Data

Oct. 8, 1991 [DE] Fed. Rep. of Germany ....... 4133277

[51] Int. Cl.[5] ............................................. G01M 15/00
[52] U.S. Cl. .................................. 73/118.1; 73/861.75
[58] Field of Search ...................... 73/118.1, 198, 861, 73/861.75, 861.76, 49.7, 37, 116, 119 R

[56] References Cited

U.S. PATENT DOCUMENTS 5,072,613 12/1991 Baer et al. ........................ 73/119 R

*Primary Examiner*—Jerry W. Myracle
*Attorney, Agent, or Firm*—Watson, Cole, Grindle & Watson

[57] ABSTRACT

A device to investigate the flow movement in cylindrical components of reciprocating piston internal combustion engines, which flow movement is generated by a flow-guiding system located, as seen in the flow direction, upstream of the cylindrical component, has at least one rotatable measuring vane in the cylindrical component, the axis of rotation of which intersects the axis of the cylindrical component at an adjustable angle other than 0°. A shaft supporting the measuring vane is connected to a device to evaluate the frequency of rotation and/or the position of the angle of the measuring vane in order to determine one or more parameters of the flow movement in the cylindrical component.

9 Claims, 2 Drawing Sheets

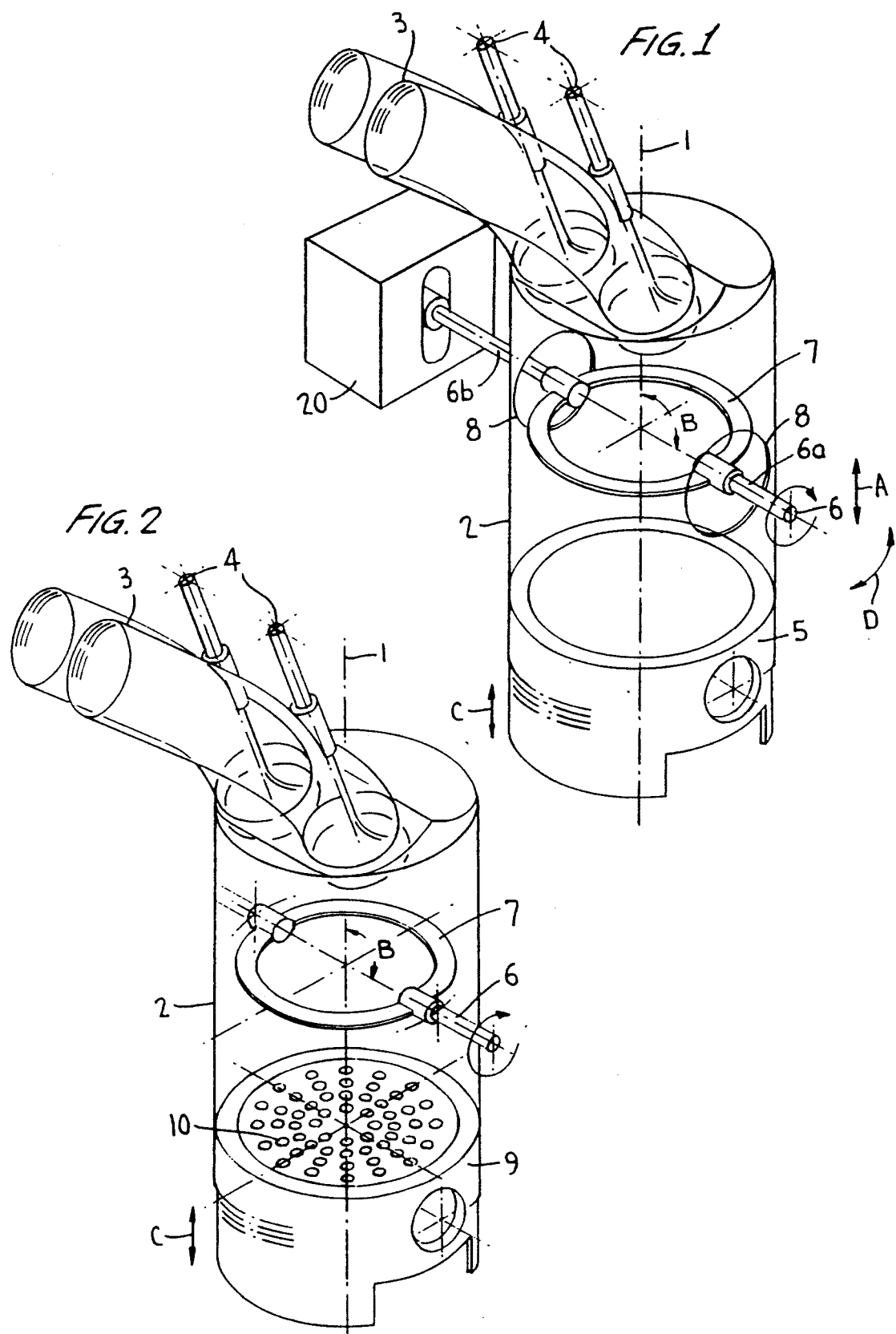

DEVICE TO INVESTIGATE THE FLOW MOVEMENT IN CYLINDRICAL COMPONENTS

BACKGROUND OF THE INVENTION

This invention relates to a device to investigate the flow movement in cylindrical components, as installed especially for reciprocating piston engines, in order to analyze the charge movement generated during the intake process within the cylinder.

The known methods of measurement relate to the investigation of the swirl flows, the axis of rotation of which being parallel to the axis of the cylinder. These swirl flows are usually found in reciprocating piston engines having one inlet valve per cylinder. With such engine designs these swirl flows are generated within the cylinder during the suction phase of the intake process due to the common tangential port configurations.

For conventional reciprocating piston engines with two inlet valves per cylinder, which are arranged parallel to the axis of the crankshaft, no swirl flow of this type is generated because of the symmetrically constructed inlet systems. With such reciprocating piston engines a shape of flow dominates, the axis of rotation thereof being arranged at right angles to the axis of the cylinder. The effect of such flow movement of the combustion of the engine differs in principle from that of the swirl flow.

For the swirl flow the rotary speed components, which in the ideal model are constant after conservation of angular momentum during the compression phase, bring about a stabilization of the vortex. For shapes of flow where the axis of rotation is vertical relative to the axis of the cylinder, the main swirl decomposes into increasingly small partial vortexes due to the movement of the piston. This decomposition process transforms the rotational energy into additional turbulence, thus generating high turbulent energy with these shapes of flow.

The different kinds of charge movements have an effect on the combustion by affecting the flame velocity as the sum of the burning rate and transport velocity. Intensive flows with the axis of rotation vertical to the axis of the cylinder lead to an increase in the turbulent burning velocity, owing to the severe increase in turbulence during the compression phase, the consequence of which is a definite flattening off of the flame surface.

For swirl flows, thus for flows whose axis of rotation is parallel to the axis of the cylinder, the production of turbulence is less intensive owing to the slower decay of the swirl. The resulting lower turbulent burning velocity is supported naturally by a more intensive transport movement, which leads to the kernel of the flame growing faster immediately following the introduction of ignition in externally ignited reciprocating piston engines.

Even though both shapes of flow, thus swirl flows with the axis of rotation parallel to the axis of the cylinder and vortexes with the axis of rotation vertical to the axis of the cylinder, lead to faster combustion, the working mechanism is totally different.

SUMMARY OF THE INVENTION

The invention is based on the problem of detecting vortex flows in a cylindrical component, the axis of rotation of which being arranged vertical to the axis of the cylinder, in a manner that from a measurement perspective is more reliable and from a construction perspective is better.

The invention provides for a device to investigate the flow movement in cylindrical components of reciprocating piston internal combustion engines, which is generated by a flow-guiding system located upstream of the cylindrical component when viewed from the direction of flow, that at least one measuring vane, whose axis of rotation intersects the axis of the cylindrical component at an adjustable angle other than 0°, can be rotated in the cylindrical component, and the shaft of the measuring vane is connected to a device to evaluate the frequency of rotation and/or the position of the angle of the measuring vane in order to determine one or more parameters of the flow movement in the cylindrical component.

Another preferred embodiment provides that the cylindrical component is closed in its axial direction, as seen in the flow direction, behind the measuring vane(s) and the flow medium entering into the cylindrical component can exit through at least one opening in the wall of the cylindrical component, whose center point or whose center points coincides or conicide substantially with the axis of rotation of the measuring vane or vanes.

Another preferred embodiment provides that the flow medium entering into the cylindrical component can exit through a flow-permeable wall that is arranged behind the measuring vane(s), as seen in the flow direction.

Special advantages relating to the method of measurement can be achieved if the axis of the measuring vane(s) can be shifted relative to the flow-carrying system in the axial direction of the cylindrical component and can be shifted about the axis of the cylindrical component.

The cylindrical component can be closed in its axial direction, seen in the flow direction, behind the measuring vane(s) by means of a flow-impermeable wall, which can be moved in the axial direction of the component.

Another preferred embodiment provides that the measuring vane(s) has/have the shape of a circular ring.

Several devices that are suitable for measuring the parameters of the flow movement can also be interactively combined; and the pressure in the cylindrical component can be less than the pressure, as seen in the flow direction, upstream of the flow-guiding system generating the flow movement.

Other advantages with respect to the measuring technique can be achieved if the flow through the cylindrical component is steady or unsteady.

BRIEF DESCRIPTION OF THE DRAWINGS

FIG. 1 is a perspective view of a first embodiment for determining, according to the invention, the movement of the flow medium vertically to the axis of the cylinder of a reciprocating piston internal combustion engine.

FIG. 2, is a view similar to FIG. 1 of a another embodiment of the invention.

DETAILED DESCRIPTION OF THE INVENTION

Figure 3:
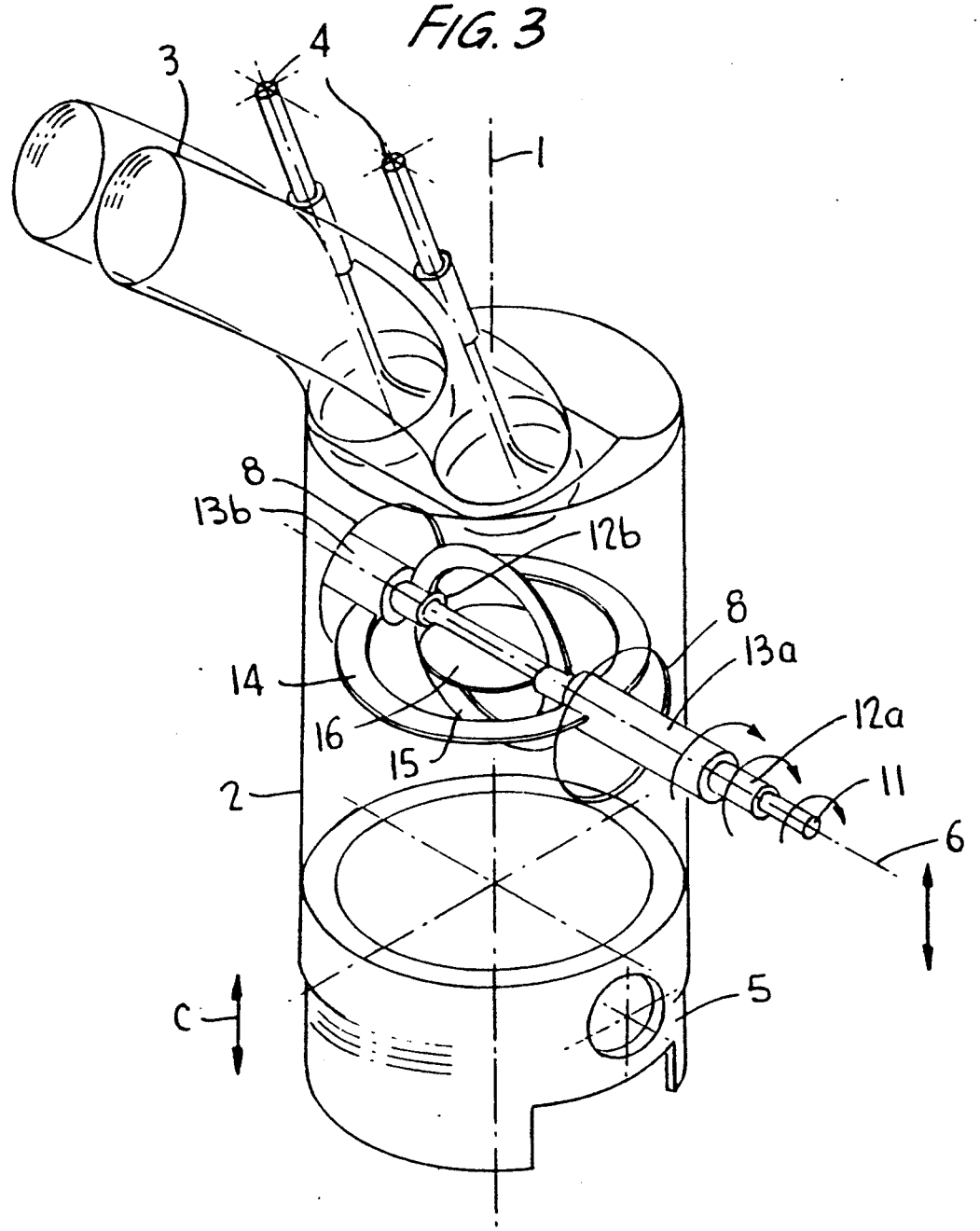
FIG. 3 is a view similar to FIG. 1 of still another embodiment of the invention.

The illustrated devices serve the purpose of simulating and investigating the flow movement in cylindrical components of reciprocating piston internal combustion engines, thus above all in the cylinders, in which a mixture of fuel and air are burned. In so doing, the charge movement relative to the axis 1 of the cylinder in an angle other than 0° can be studied.

This purpose is served by a cylindrical component 2, the inner diameter thereof corresponding to the inner diameter of a cylinder of an internal combustion engine, and the properties of which are to be studied. The flow-guiding parts of the reciprocating piston engine in particular the inlet ports 3 and valves 4, the stroke of which is adjustable to match the operating mode of the reciprocating piston engine, are mounted on the upper part, thus in the flow direction upstream of the cylinder head (not illustrated) in the radial direction in accordance with the operating conditions of the engine to be studied, serves as a closure of the cylindrical component 2. The position of the piston 5 is adjustable in the axial direction to match the actual assignment with respect to the valve stroke during the suction phase.

A measuring vane 7, rotatable about its axis 6 which is coaxial with shaft segments 6a and 6b on which the vane is supported, is approximately equidistant between the cylinder head and the piston 5. The axis 6 of the measuring vane 7 is perpendicular to the cylinder axis 1. Driven by an externally generated pressure gradient, the air flows steadily through the inlet ports 3 into the cylindrical component 2, and it can flow out of the cylindrical component 2 via openings 8 located in the wall of the cylindrical component 2. In such manner the measuring vane 7, which may be in the form of a circular ring, is set into rotation. The air leaves the cylindrical component 2 in the direction of the axis 6 of the measuring vane 7 through the openings 8.

Shaft segment 6b of the measuring vane 7 is connected to a device 20 to evaluate the rotary frequency and/or the angular position of the measuring vane 7 to determine one or more parameters of the flow movement in the cylindrical component 2.

One of the distinctions between the embodiment shown in FIG. 2 and the embodiment according to FIG. 1 is that the piston 9 of FIG. 2 is permeable to flow. Thus the bottom of the piston 9 can have, for example, bores 10. Compared to the embodiment according to FIG. 1, the result is that the flow conditions out of the cylindrical component 2 are different. The showing of device 20 is eliminated from FIG. 2 for the sake of clarity.

Both embodiments provide a means to study the flow movement in a cylindrical pipe, which is generated by flow-guiding components such as parts 3 and 4 which are located, relative to the flow direction, upstream of the cylindrical pipe. At least one measuring vane, rotatable in the cylindrical pipe, has an axis of rotation which intersects axis 1 of the cylindrical pipe at an angle B, which is other than 0°. In FIG. 1, angle B is adjustable as permitted by openings 8. In FIG. 2, angle B is selected and fixed for each arrangement.

With such a measuring system the flow phenomena in the cylinder of reciprocating piston engines can be reproduced in a simple manner and can be observed in detail for flow characteristics that are important for the combustion process.

To determine the strength of the vortex motion with respect to any arbitrary axis of reference orientated in the cylindrical pipe, the axis of the vane is correspondingly aligned and the speed of the vane is measured. In so doing, the embodiment according to FIG. 1 ensures through the openings 8 in the cylinder wall, the central axis of which coincides substantially with the axis of rotation 6 of the measuring vane 7, that the total mass flow and thus also the angular momentum proportion of the flow movement with respect to the axis of the vortex is detected by the measuring vane 7.

The geometry of the measuring vane is chosen in such a manner that only those portions of the flow that are tangential to the axis of rotation 6 influence the speed of the vane. In this manner it is ensured that the measured speed is proportional to the total angular momentum of the flow based on the axis of rotation of the measuring vane 7 and thus the transferability to the conditions when the engine is running is ensured. The vane configuration directly in the cylindrical pipe is quite relevant, since in this manner the vortex components are measured directly and the determination of the actual level of velocity of the vortex flow required to view the energy is enabled.

The embodiment shown in FIG. 3 differs from the embodiment according to FIGS. 1 and 2 in that, instead of a small measuring vane 7, there are several measuring vanes 14, 15, 16 having a coincident axis of rotation 6. Vane 16 is mounted on shaft 11, vane 15 is mounted on shaft segments 12a, 12b, and vane 14 is mounted on shaft segments 13a, 13b. Segments 12a, 12b and 13a, 13b are concentric with shaft 11 and are respectively independently rotatable relative to one another so that the speed vanes 14, 15, 16 can be measured individually.

By the provision of several measuring vanes 14, 15, 16, the flow profile of the vortex flow can be investigated. The information concerning the flow structure that is obtained thus can be used to interpret the mixing procedure for incoming mixtures of fuel and air.

Since, depending on the geometric design of the flow-guiding component to be investigated when the flow with an axis of rotation perpendicular to the axis of the cylinder enters into the cylindrical pipe, the flow components with an axis of rotation parallel to the axis of the cylinder can also be superposed, the angle between the axis of rotation of the measuring vane 7 and the axis of the cylinder 1 is adjustable as facilitated by openings 8. In addition, the measuring vane 7, and the vanes 14, 15, 16, can be shifted in the axial direction of the cylindrical pipe (in the direction of double arrow A) relative to the distance of the flow-guiding component; and the axis 6 of the measuring vane(s) can be adjusted to a limited extent (in the direction of double arrow D) about the axis of the cylinder. The variability of the position of the measuring vane(s) makes it possible to also determine, in addition to the intensity of turbulence generated upon flowing into the cylindrical pipe, its precise orientation characterized by the maximum speed of the vane(s). Thus, more complex shapes of flow that occur more frequently following the introduction of multi valve technology can be investigated in an advantageous manner.

Another important advantage can be achieved by considering the geometric inflow parameters by reproducing the exact cylinder geometry of the reciprocating piston engine, including the deflection of the flow at the piston. Thus, the cylindrical pipe 2 is closed by the piston 5 of a reciprocating piston engine or a reproduction in the axial direction, seen in the flow direction, behind the measuring vane 7 or measuring vanes 14, 15, 16. In connection with the flow exiting through the openings 8 of the cylinder wall, the central axis of which coincides substantially with the axis of rotation 6 of the measuring vane 7 or the axis of rotation 6 of shafts 11, 12, 13 of the measuring vanes 14, 15, 16, the reactive effects on the development of the vortex flow are avoided in a stationary measuring operation. In this manner the transferability of the measured results to the running of the engine is ensured.

In the embodiment according to FIG. 2 the flow-permeable piston 9, which is arranged, seen in the flow direction, behind the measuring vane 7 or behind the measuring vanes (when adapted for use with the FIG. 3 embodiment), closes the cylindrical pipe 2 in the axial direction. The advantage of this embodiment is that during stationary operation of the measuring procedure that portion of the flow that escapes through the permeable piston 9 corresponds with the engine running to the proportion of the mass that flows into the cylinder and that fills the cylinder volume added during the suction process through the downwardly moved piston.

The axial adjusted displacement (in the direction of double arrow C) of the position of the closure or the flow-permeable piston 9 attached, seen in the flow direction, behind the measuring vane 7 or the measuring vanes enables in an advantageous manner the study of the influence of the position of the piston on the flow movement in the cylinder. This procedure is relevant in order to explain the detailed processes during the suction phase during which the geometry of the cylindrical chamber changes constantly as a consequence of the movement of the piston.

To generate the pressure differential necessary for the intake process into the cylindrical component 2 of the measuring device, the pressure in the cylindrical component 2 is set lower than the ambient pressure via some suitable pressure valves. This pressure differential can be generated either by lowering the pressure in the cylindrical component 2 or by increasing the pressure upstream of the flow-guiding component to be investigated.

The flow measurement can be conducted in an advantageous manner during steady flow. The design of the measuring device ensures the good transferablility of the found measured values to the engine operation.

The advantage of an alternative embodiment is that the flow through the measuring device can be unsteady in order to thus determine additionally the gas dynamic effects.

According to the invention, several identical devices can be combined to study the flow movements in cylindrical pipes, so that, for example, there is simultaneous flow through all of the cylinders of the cylinder head, as the flow-guiding component, when the engine operates at wide open throttle.

What is claimed is:

1. Device to investigate the flow movement in a cylindrical component of a reciprocating piston internal combustion engine, which is generated by a flow-guiding system located, as seen in the flow direction, upstream of the cylindrical component comprising at least one rotatable measuring vane having shaft segments on which said vane is supported, said measuring vane being located within the cylindrical component and having an axis of rotation intersecting the central axis of the cylindrical component at an adjustable angle other than 0°, said axis of rotation being coaxial with said shaft segments, a device for evaluating the frequency of rotation and/or the position of the angle of the measuring vane in order to determine one or more parameters of the flow movement in the cylindrical component, one of said segments being connected to said evaluating device.

2. Device to investigate the flow movement in cylindrical components, as claimed in claim 1, wherein a plurality of measuring vanes are located within the cylindrical component and have said axis of rotation.

3. Device to investigate the flow movement in cylindrical components, as claimed in claims 1 or 2, wherein means is provided in the cylindrical component for closing the cylindrical component in its axial direction, as seen in the flow direction, behind said one measuring vane or behind said plurality of measuring vanes, and wherein the flow medium entering the cylindrical component can exit through at least one opening provided in the wall of the cylindrical component, said opening having a central axis coincident with said axis of rotation.

4. Devices to investigate the flow movement in cylindrical components, as claimed in claim 3, wherein said closing means comprises a flow-impermeable wall mounted for adjustment in the axial direction of the component.

5. Device to investigate the flow movement in cylindrical components, as claimed in claims 1 or 2, wherein the flow medium entering the cylindrical component can exit through a flow-permeable wall provided behind said one measuring vane or behind said plurality of measuring vanes as seen in the flow direction.

6. Device to investigate the flow movement in cylindrical components, as claimed in claim 5, wherein the flow-permeable wall is mounted for movement in the axial direction of the cylindrical component.

7. Device to investigate the flow movement in cylindrical components, as claimed in claims 1 or 2, wherein said one measuring vane or said plurality of vanes, together with the axis of rotation thereof are mounted within the cylindrical component for adjustable movement in the axial direction of the cylindrical component and are mounted for adjustable movement about the axis of the cylindrical component.

8. Device to investigate the flow movement in cylindrical components, as claimed-in claims 1 or 2, wherein the one measuring vane or the plurality of measuring vanes are each in the form of a circular ring.

9. Device to investigate the flow movement in cylindrical components, as claimed in claim 1, wherein means on the cylindrical component is provided for reducing the pressure therein to below ambient pressure.

* * * * *